United States Patent [19]
Kim et al.

[11] Patent Number: 5,476,917
[45] Date of Patent: Dec. 19, 1995

[54] PROCESS FOR PREPARING GRAFTED ORGANIC POLYESTER OF PHOSPHORIC ACID

[75] Inventors: Sang-Hoon Kim, Soowon; Jong-Myung Park, Seoul; Ki-Ho Byun, Soowon, all of Rep. of Korea

[73] Assignee: Korea Chemical Co., Ltd., Kyongsangnam-Do, Rep. of Korea

[21] Appl. No.: 358,890

[22] Filed: Dec. 19, 1994

[30] Foreign Application Priority Data

Dec. 30, 1993 [KR] Rep. of Korea ............... 31591/1993

[51] Int. Cl.$^6$ .................................................... C08G 18/28
[52] U.S. Cl. ........................... 528/72; 528/59; 528/65; 528/73; 528/74; 528/86; 525/452; 525/460
[58] Field of Search .................... 528/59, 65, 72, 528/73, 74, 86; 525/452, 460

[56] References Cited

U.S. PATENT DOCUMENTS

| | | |
|---|---|---|
| 5,019,615 | 5/1991 | Mizuno et al. ............ 524/100 |
| 5,026,743 | 6/1991 | Beresford et al. ............ 523/404 |
| 5,115,074 | 5/1992 | Umetani et al. ............ 528/98 |
| 5,116,906 | 5/1992 | Mizuno et al. ............ 525/68 |
| 5,342,881 | 8/1994 | Muller et al. ............ 524/700 |

*Primary Examiner*—Samuel A. Acquah
*Attorney, Agent, or Firm*—Watson Cole Grindle & Watson

[57] ABSTRACT

This invention is directed to a process for preparing grafted organic polyester of phosphoric acid, incorporated into water-borne coating compositions, reducing remarkably the tendency of aluminum flake pigments to react with the aqueous medium of the compositions, resulting in generation of hydrogen. This can be obtained by grafting the reaction product from the reaction of an orthophosphorus derivative with a compound which contains in the molecule an epoxide group and aromatic or alicyclic group, to a pre-polymer having isocyanate group as an end group and an ethyleneoxide group. The grafted organic polyester of phosphor acid has excellent dispersity with pigments and results in satisfactory adhesion with resin as a binder because it prevents pigments from contacting with water during water dispersing.

5 Claims, No Drawings

PROCESS FOR PREPARING GRAFTED ORGANIC POLYESTER OF PHOSPHORIC ACID

BACKGROUND OF INVENTION

This invention relates to a process for preparing grafted organic polyester of phosphoric acid. The grafted organic polyester of phosphoric acid, incorporated into water-borne coating compositions for automobile, containing metallic flake pigments, may prevent or reduce the tendency of metallic flake pigments to react with the aqueous phase of the compositions, resulting in generation of gas.

Corporating metallic pigments into coating compositions is well known, and, particularly it is an established practice to use aluminum flake pigments in compositions intended for production of the so-called "glamour" finishes upon automobile bodies, by which a differential light refraction effect, depending on the angle at which the coated surface is viewed, is achieved.

Usually, such coating compositions were solvent-borne, but in recent years, as a result of the growing concerns for reduction of atmospheric pollution, a trend towards water-borne compositions has increased. For example, there is described in British Patent Specification No. 2073609A, a coating process in which a specified type of water-borne basecoat composition containing aluminum flake pigment was applied for the first time.

Difficulties are confronted in incorporating metallic pigments, particularly those of aluminum or aluminum alloys, into water-borne coating compositions, caused by the tendency of the pigment to react with the water present, resulting in generation of hydrogen. This could cause a safety problem if the compositions are stored in closed containers, and also a degeneration of coating product by generation of hydrogen.

Many solutions have been proposed in which this "gassing" effect can be minimized or prevented, most of which involve some form of chemical treatment of metallic pigments to render them less reactive towards the aqueous medium of coating composition. It is known that orthophosphoric acid is most effective for this purpose, but its presence in coating compositions leads to poor chemical properties in films derived from them. Alkyd esters of phosphoric acid make up for this problem to a limited extent, but its addition to a basecoat causes an impaired adhesion with topcoat. It has now been proposed to use organic ester of phosphoric acid, but it is shown that storage problem persists and poor mechanical properties cannot be overcome without effective preparation of Water-soluble aluminum.

SUMMARY OF INVENTION

The present invention relates to a method of preparing grafted organic polyester of phosphoric acid, incorporated into water-borne coating compositions containing metallic flake pigments, preventing or reducing the tendency of aluminum flake pigments to react with the aqueous medium of the composition, resulting in generation of hydrogen. The grafted organic polyester of phosphoric acid is obtained by grafting the reaction product from the reaction of an orthophosphorous derivative with a compound which contains in the molecule an epoxide group and aromatic of alicyclic group, to a pre-polymer having an isocyanate group as an end-group and ethyleneoxide group.

DETAILED DESCRIPTION OF INVENTION

The present invention relates to a method of preparing grafted organic polyester of phosphoric acid, minimizing or preventing the generation of hydrogen in waft-borne coating composition.

According to the present invention there are provided a compound (A), an orthophosphorus derivative which contains in the molecule the grouping of

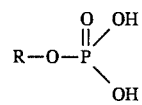

where R is a hydroxyl, alkyl, aromatic or alkyl-substituted aromatic group, a compound (B) which contains In the molecule at least one epoxide group and at least one aromatic or alicyclic group, and a compound (C), a pre-polymer having isocyanate group as an end-group and ethyleneoxide group. The pre-polymer is finally grafted to a salt derivative as the reaction product of the compound (A) with the compound (S). If the compound (A) and or one of the compound (B) contain an aliphatic group of more than 6 carbon atoms, the total proportion of the aliphatic group In the reaction product does not exceed 60% by weight.

Phosphorus compounds containing the above defined grouping which are suitable as compound (A) include phosphoric acid and monoesters of phosphoric acid. Examples of suitable monoesters of phosphoric acid include monobutyl phosphate, monoamyl phosphate, monononyl phosphate, monocetyl phosphate, monophenyl phosphate, and monobenzyl phosphate. Where phosphoric acid is used as the compound (A), it is preferred to employ the 100% acid, since the water present competes for the available epoxide groups and results in some detriment to the Intended efficiency as a gassing inhibitor.

Compounds containing In the molecule at least one aromatic or alicyclic ring and at least one epoxide group are suitable as the compound (B). For example, the compounds may include phenylglycidyl ether, α-naphthylglycidyl ether, β-naphthylglycidyl ether, and the corresponding compounds having an alkyl substituent of not more than six carbon atoms on the aromatic ring. Another suitable type comprises the glycidyl esters of aromatic monocarboxylic acids, such as glycidyl benzoate, glycidyl naphthonate and the glycidyl ester of substituted benzoic acid and naphtholic acid.

The compound (B) may be a compound containing two or more aromatic or alicyclic rings and or two or more epoxide groups. Typical of such compounds are the epoxy resins, that is called the glycidyl polyethers of polyhydric phenols or hydrogenated phenols. Following is the general formula of epoxy resin, where h is zero or an integer from 1 to 20.

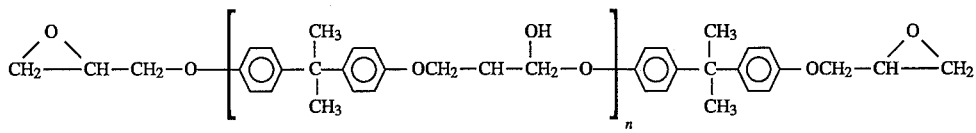

It is, in general, obtained by the reduction of epichlorohydrin with bisphenol-A, and the hydrogenated analogs of the above adducts are also suitable. Many types of epoxy resin are commercially available and suitable examples of these include "GY-260", "GY-6071" and "GY-6084" made by Ciba-Geigy and similar resin of "R 8010" and "R8040" by Korea Chemical.

The compound (C) is described to contain an isocyanate group as an end-group and ethyleneoxide group. Before preparing this material, organic diisocyanate having general formula of R' (NCO)$_2$ should be provided, where R' is an aliphatic hydrocarbon group of $C_4$-$C_{18}$, a cycloaliphatic hydrocarbon group of $C_5$-$C_{15}$, an aromatic hydrocarbon group of $C_6$-$C_{15}$, or a aliphatic hydrocarbon group of $C_7$-$C_{15}$. Examples of available materials for organic diisocyanate include tetramethylene diisocyanate, hexamethylene diisocyanate, dodecamethylene diisocyanate, cyclohexane-1,3-diisocyanate, cyclohexane-1,4 -diisocyanate, isocyanato-3-isocyanatomethyl-3,5,5-trimethyl cyclohexane and 4,4-diisocyanate-cyclohexyl methane. Also available are the toluene-2,6-diisocyanate of aromatics and a mixture of the above-mentioned isomers.

Such organic diisocyanates are reacted with a material which could be called "monovalent alcohol" containing ethyleneoxide. One group of the diisocyanate is reacted with the monovalent alcohol and the other is adducted with the hydroxyl group of the reaction product from the reaction of compound (A) with compound (B) to form urethane linkage. Following is the general formula of a monovalent alcohol:

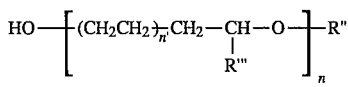

where R" is alkyl group of which the number of carbon is not less than 1; R''' is an alkyl or hydrogen; n may be an integer from 1 to 20 and n' be zero or an integer from 1 to 6. The typical examples of manovalent alcohol are polyethyleneglycol monobutylether, polyethyleneglycol monoethylether, and poly-propyleneglycol monoethylether.

The number average molecular weight of this material should be controlled not to exceed 1000, Preferably between 400 and 500.

It is already mentioned that the reaction of the compound (A) with the compound (B) should be proceeded prior to being grafted with the compound (C) to obtain grafted organic polyester of phosphoric acid. The relative proportions of the compounds (A) and (B) may vary widely. In the case of a monofunctional compound (B), i.e. one containing in the molecule a single epoxy group, this may be used in a proportion of n moles per mole of the compound (A), where n is the number of replaceable hydrogen atoms in the compound (A) reduced by the compound (B); this is in order to allow retention of one P-OH group in the reaction product. In the case of a polyfunctional compound (B), there may be used, for example, 2 moles of orthophosphoric acid, 1 mole of an aromatic epoxy resin containing two epoxy groups per molecule, and 2 moles of epoxy resin containing an aromatic or an aliphatic monoepoxide. It will be understood, however, that in any case Where the reactants are polyfunctional, the product is to be a statistical mixture of a number of different molecular species. The compounds (A) and (B) may be reacted together in the presence of a substance known to catalyze the opening of the epoxide ring, for example, a base catalyst such as triethylamine. An elevated temperature, for example, up to 150° C., may be employed, if necessary, to ensure that the reaction goes to completion, but the initial stage of the reaction is quite exothermic, and regulated addition of one reactant to the other and cooling is necessary. In order to maintain fluidity of the reaction mixture, it may be advantageous to use an inert solvent such as tetrahydrofuran. The product from the reaction of the compound (A) with the compound (B) may be used as protecting agent for metallic pigment, but, in case that this is applied to a water-borne metallic topcoat which is a final product, it is inferior in basic properties relative to the conventional solvent-borne coating. In addition to a storage problem of the product itself, poor mechanical properties can be cited as an instance.

The present invention makes up the above-mentioned defects, that is, the previously prepared pro-polymer having an ethyleneoxide group and an isocyanate as an end-group is adducted with the product from the reaction of the compound (A) with the compound (B), whereby its storage property in water as a solvent, mechanical properties such as chipping arid wetting with a substrate surface are improved. An example of method for preparing a pre-polymer having an isocyanate as an end-group is to react 1 mole of isophorone diisocyanate with 1, mole of polyethyleneglycol monobutyl ether, where the reaction is carried out at about 50° C. to 120° C., preferably 60° C. to 80° C. And the pre-polymer is combined with the hydroxyl groups of the product from the reaction of the compound (A) with the compound (B) by the equivalent molar ratio of 1:0.5 to 1:2.5, preferably in the ratio of 1.1.2, grafted organic ester of phosphoric acid is finally obtained.

The process for preparing grafted organic polyester of phosphoric acid as a final product of this invention is illustrated by the following examples, but the invention cannot be limited by these examples.

PREPARATIVE EXAMPLE I

Preparation of pre-polymer containing isocyanate group as an end-group.

Preparative Example I-1

|  | (Parts by weight) |
|---|---|
| Isophorone diisocyanate | 111 (0.5 mole) |
| methyl isobutylketone | 155 |

-continued

| | (Parts by weight) |
|---|---|
| polyethylene glycol monomethylether (M. W.: 350) | 175 (0.5 mole) |
| dibutyltin dilaurate | 1.5 |

A solution of isophorone diisocyanate was prepared in a round-bottom flask equipped with a reflex condenser and overhead stirrer. After polyethyleneglycol monomethylether was added slowly for 1 hour, the reaction mixture was stirred at 80° C. for 2 hours. The reaction temperature must be controlled by cooling bath because this reaction may be quite exothermic. The reaction was stopped at a point obtaining 18% of isocyanate content.

Preparative Example I-2

| | (Parts by weight) |
|---|---|
| tetramethylene diisocyanate | 90 (0.5 mole) |
| methyl isobutylketone | 155 |
| polyethylene glycol monomethylether (M. W.: 350) | 175 (0.5 mole) |
| dibutyltin dilaurate | 1.5 |

A solution of tetramethylene diisocyanate was prepared in a round-bottom flask equipped with a reflux condenser and overhead stirrer. After polyethyleneglycol monomethylether was added slowly for 1 hour, the reaction mixture was stirred at 80° C. for 2 hours. The reaction temperature must be controlled by cooling bath because this reaction may be quite exothermic. The reaction was stopped at a point obtaining 18% of isocyanate content.

Preparative Example I-3

| | (Parts by weight) |
|---|---|
| toluene 2,4-diisocyanate | 87 (0.5 mole) |
| methyl isobutylketone | 155 |
| polyethylene glycol monomethylether (M. W.: 350) | 175 (0.5 mole) |
| dibutyltin dilaurate | 1.5 |

A solution of toluene 2, 4-diisocyanate was prepared in a round-bottom flask equipped with a reflux condenser and overhead stirrer. After polyethyleneglycol monoethylether was added slowly for 1 hour. the reaction mixture was stirred at 80° C. for 2 hours. The reaction temperature must be controlled by cooling bath because this reaction may be quite exothermic. The reaction was stopped at a point obtaining 18% of isocyanate content.

PREPARATIVE EXAMPLE II

Preparation of organic polyester of phosphoric acid.

Preparative Example II-1

A mixture or epoxy resin (GY 260, 42.0 parts, 0.5 mole) and phenylglycidyl ether (33.3 parts, 1.0 mole), was added slowly with stirring over a period of about 1 hour to orthophosphoric acid (24.65 parts, 1 mole) containing triethylamine (0.15 part). The reaction. temperature was allowed to rise as a result of the exotherm, a maximum of about 120° C being attained. Heating at 110° C.~120° C. was continued for 2 hours to ensure complete reaction. The resultant product was brown, viscous liquid of acid value 124 mg KOHg. The product was held at 50° C. to proceed adduct reaction by using pre-polymer as mentioned above because the resultant viscous liquid congeals at room temperature.

Preparative Example II-2

A mixture of epoxy resin (GY 260, 42.0 parts, 0.5 mole) and glycidyl benzoate (1.0 mole) was added slowly with stirring over period of about 1 hour to monobutyl phosphate (1.0 mole) containing triethylamine (0.15 part). The reaction temperature was allowed to rise as a result of the exotherm, a maximum of about 120° C. being attained. Heating at 110° C.~120° C. was continued for 2 hours to ensure complete reaction. The resultant product was brown, viscous liquid of acid value 124 mg KOHg. The product was held at 50° C. to proceed adduct reaction by using pre-polymer as mentioned above because the resultant viscous liquid congeals at room temperature.

Examples Preparation of grafted organic polyester of phosphoric acid.

Grafted organic polyester of phosphoric acid was prepared by reaction of pre-polymer (from Preparative Example I) with organic polyester of phosphoric acid (from Preparative Example II).

| | (Example 1~Example 6) | | | | | (mole) |
|---|---|---|---|---|---|---|
| | Example 1 | Example 2 | Example 3 | Example 4 | Example 5 | Example 6 |
| I-1 | 0.125 | 0.125 | | | | |
| I-2 | | | 0.125 | 0.125 | | |
| I-3 | | | | | 0.125 | 0.125 |
| II-1 | 1 | | 1 | | 1 | |
| II-2 | | 1 | | 1 | | 1 |

*All Examples used 0.8 part of dibutyltin laurate as a catalyst.

Example 1

The product (1.0 mole) synthesized from Preparative Example II-1 was prepared in 1L-round flask equipped a reflux condenser, overhead stirrer and N₂ inlet. After the pre-polymer (0.125 mole) synthesized from Preparative Example I-1 was added slowly for 30 min. the reaction mixture was stirred at 80° C. for 2 hours. The reaction temperature was controlled in cooling bath to avoid excessive rise in temperature.

The reaction was stopped at a point that the resultant product had 72.9 mg KOHg of acid value and below 0.1% of isocyanate content. The final product: was pale brownish liquid of 80% solid content.

Example 2

The procedure described in Example 1 was repeated, except that the product from Preparative Example II-2 instead of that from Preparative Example II-1 was used. The property of product was similar with that of Example 1.

Example 3

The procedure described in Example 1 was repeated, except that the pre-polymer from Preparative Example I-2 instead of that from Preparative Example I-1 was used. The product was similar with that of Example 1.

Example 4

The procedure described in Example 1 was repeated, except that the pre-polymer from Preparative Example I-2 instead of that from Preparative Example I-1 and the product from Preparative Example II-2 instead of that from Preparative Example II-1 were used. The product was similar with that of Example 1.

Example 5

The procedure described in Example 1 was repeated, except that the pre-polymer from Preparative Example I-3 instead of that from Preparative Example I-1 was used. The product was similar with that of Example 1.

Example 6

The procedure described in Example 1 was repeated, except that the pre-polymer from Preparative Example I-3 instead of that from Preparative Example I-1 and the product from Preparative Example II-2 instead of that from Preparative Example II-1 were used. The product was similar with that of Example 1.

The structure of a product from Example 1 is that an urethane linkage is grafted to backbone of polymer from Preparative Example II-1. The grafted urethane linkage results in satisfactory properties and high gloss due to excellent dispersion of resins as a binder with pigments. Also properties of the product from Example 3 are similar with those of the product from Example 1, moreover the product from Example 3 containing 6 methylene groups has a longer grafted urethane linkage compared to that of Example 1 and has excellent adhesion with resin as a binder by hydrophobicity of methylene group, being prevented from contacting with water.

What is claimed is:

1. A process if or preparing grafted organic polyester of phosphoric acid comprising steps (i) and (ii) below:

(i) reacting a compound (A), an orthophosphorus derivative which contains in the molecule the grouping of

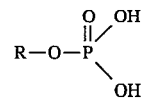

where R is a hydroxyl, alkyl, aromatic or alkyl-substituted aromatic group, with a compound (B) which contains in the molecule at least one epoxide group and at least one aromatic or alicyclic group to produce salt derivatives;

(ii) grafting a compound (C) a pre-polymer having isocyanate group as an end-up and ethyleneoxide group, to a salt derivative from step (i).

2. A process according to claim 1, wherein said compound (C) is combined with the hydroxyl groups of said salt derivatives from step (i) by the equivalent molar ratio of 1:1.2.

3. A process according, to claim 1, wherein said compound (A) is phosphoric acid, monobutyl phosphate, monoamyl phosphate, monononyl phosphate, monophenyl phosphate, or monobenzyl phosphate.

4. A process according to claim 1, wherein said compound (B) is phenylglycidyl ether, ζ-naphthylglycidyl ether, β-naphthylglycidyl ether, benzylglycidyl ether, glycidyl benzoate, or glycidyl naphthonate.

5. A process according to claim 1, wherein said compound (C) includes a reaction product from the reaction of monovalent alcohol containing ethyleneoxide group with an organic diisocyanate.

* * * * *